July 18, 1961
R. KELLER
2,992,719
STOP MOUNTING ARRANGEMENT FOR TYPEWRITER
LINE SPACING DEVICES
Filed Aug. 11, 1959
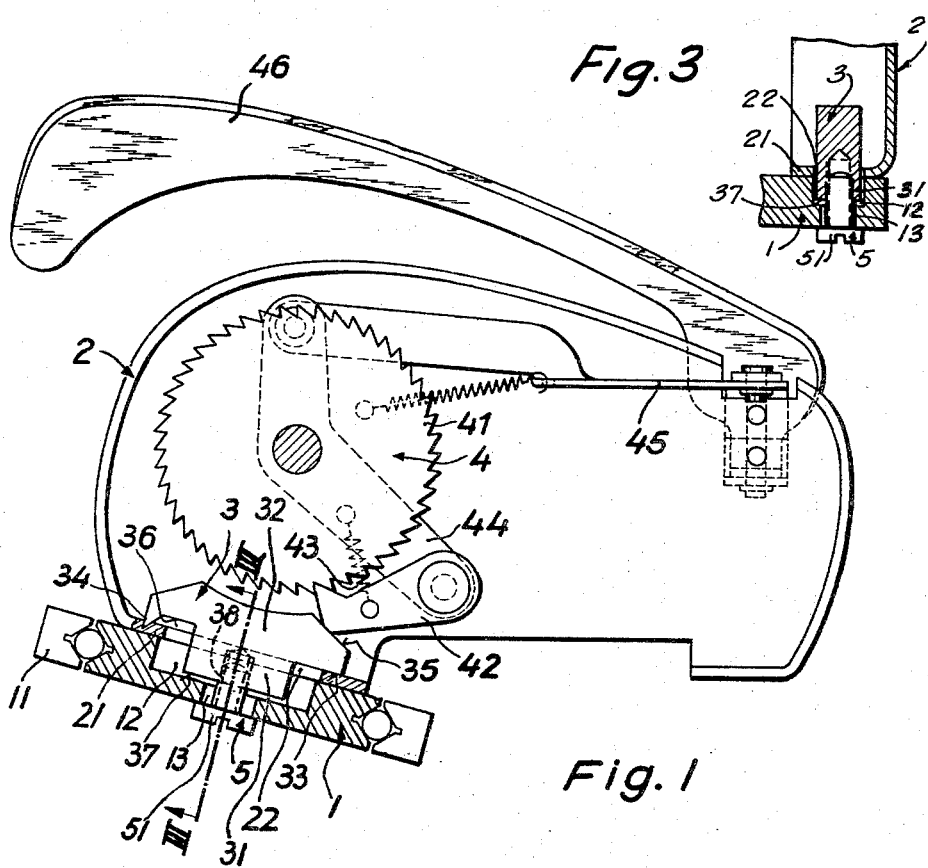
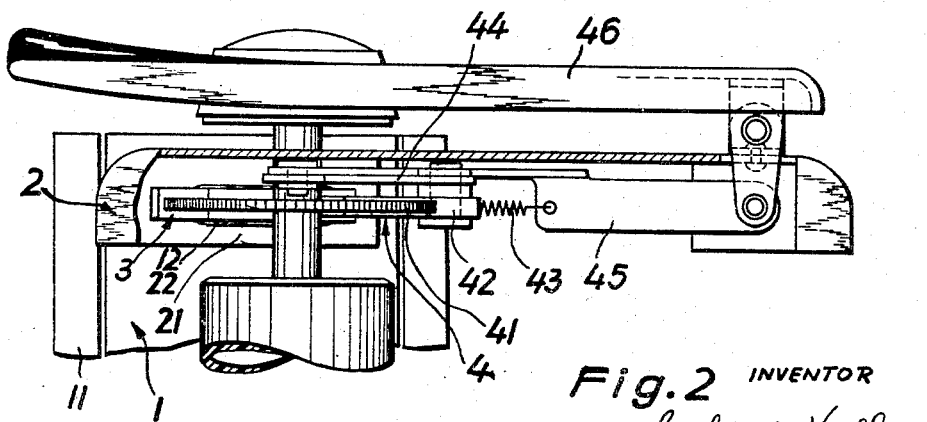
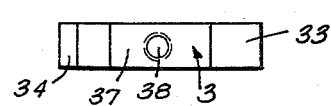
INVENTOR
Richard Keller
BY
Michael S. Striker
Attorney

United States Patent Office 2,992,719
Patented July 18, 1961

2,992,719
STOP MOUNTING ARRANGEMENT FOR TYPEWRITER LINE SPACING DEVICES
Richard Keller, Wilhelmshaven, Germany, assignor to Olympia Werke AG, Wilhelmshaven, Germany
Filed Aug. 11, 1959, Ser. No. 832,939
Claims priority, application Germany Aug. 20, 1958
9 Claims. (Cl. 197—114)

The present invention relates to a stop mounting arrangement, and more particularly to a stop mounting arrangement for the line spacing device of a typewriter.

Business machines, and particularly typewriters, are provided with carriages having line spacing devices for the platen of the typewriter. Such line spacing devices include a shiftable pawl cooperating with a ratchet wheel. It is necessary to accurately and permanently determine the terminal position of the line shifting pawl in which the ratchet wheel is operated.

In known arrangements, a stop cooperating with the line shifting pawl, is welded or riveted to the carriage, which requires bending of the fixedly attached stop until it is adjusted to the desired position for stopping the line shifting pawl. However, stop members for this purpose have to be rigidly constructed, since they are subjected to blows by the line shifting pawl which are rather strong and very frequent. Consequently, bending of the stop member requires great forces, which may result in deformation of the supporting parts on which the stop member is welded or riveted.

In other typewriter constructions, the stop member for the line shifting pawl is slidably mounted and is frictionally held upon tightening of a threaded means. However, due to the very frequent blows of the line shifting pawl against the stop member, the threaded connection is loosened, and the exact position of the stop member cannot be maintained.

It is one object of the present invention to overcome disadvantages of known stop mounting arrangements, and to provide a stop mounting arrangement which on one hand permits exact adjustment of a stop in a desired position, and on the other hand, results in a permanent and rigid mounting of the stop which cannot be loosened even if subjected to very frequent and strong impact forces.

Another object of the present invention is to provide a mounting arrangement for the stop of the line shifting pawl of a typewriter which overcomes the disadvantages of arrangements of the prior art serving the same purpose.

Another object of the present invention is to provide a mounting arrangement for a stop permitting accurate adjustment of the stop to a desired position, but assuring a permanent and rigid attachment of the stop.

Another object of the present invention is to provide a stop mounting arrangement of inexpensive construction which can be accurately adjusted during assembly operations, but will rigidly hold a stop on a supporting means.

With these objects in view, the present invention mainly consists in an arrangement which comprises, in combination, supporting means, for example a part of a typewriter carriage; a member, such as a stop member for the pawl of a line spacing device, the member having a projecting claw; and means operable between an adjustable position in which the member can be adjusted, and a holding position in which the claw is at least partly embedded in the supporting means, deforming the material of the same. In this manner, a stop member can be adjusted to a desired adjusted position for stopping the pawl of a line spacing device in a terminal position, while after the claw is embedded in the supporting means, the stop member is permanently and rigidly fixed on the supporting means of the typewriter carriage in the position desired for stopping the line shifting pawl.

In the preferred embodiment of the present invention, the stop member is T-shaped, and has a center portion slidably guided in a guide slot of the supporting means. A screw projects into a threaded bore of the stop member, and urges a mounting face and the claw into engagement with the supporting means of the typewriter carriage. Preferably, the face engaged by the line shifting pawl is inclined to the guide slot in the supporting means and to the direction of adjustment of the stop member, so that a particularly accurate adjustment is possible.

The claw of the stop member is preferably hardened so as to be harder than the metal of the supporting means into which it is forced.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is a fragmentary cross-sectional view illustrating a preferred embodiment of the present invention as provided on a typewriter carriage cooperating with the line spacing device;

FIG. 2 is a fragmentary plan view of the embodiment shown in FIG. 1 with a wall portion omitted for the sake of clarity;

FIG. 3 is a fragmentary sectional view taken on line III—III in FIG. 1; and

FIG. 4 is a bottom view of the stop member used in the embodiment of FIG. 1.

Referring now to the drawings, the supporting plate 1 of a typewriter carriage is mounted for movement on a pair of rails 11. A lateral cover 2 is secured to supporting plate 1 and covers a line spacing device 4. Line spacing device 4 includes a ratchet wheel 41, and a ratchet pawl 42 connected by spring 43 to a lever 44 which is operated through a link 45 by a manually operated lever 46.

The cover 2 has a flat anchoring portion 21 which is located on the supporting plate 1 and has an opening 22. Opening 22 is located over a guide slot 12 provided in the supporting plate 1. An elongated hole 13 passes through supporting plate 1 into guide slot 12.

A T-shaped stop member 3 has a central guide portion 31 mounted in guide slot 12 for sliding movement. The bar portion 32 of stop member 3 has on one end a mounting face 33 and on the other end a hardened claw 34 projecting beyond the plane of mounting face 33. An inclined abutment face 35 cooperates with pawl 42 of the line spacing device and is engaged by the same when pawl 42 projects into a notch of ratchet wheel 41. The face 36 is farther spaced from face 37 than mounting face 33.

A threaded bore 38 is provided in face 37 of portion 31, and a screw 5 is threaded into bore 38 and engages with its head 51 the supporting plate 1 of the carriage.

In the position illustrated in FIG. 1, stop member 3 is permanently adjusted. During the assembly, portion 31 is placed in guide slot 12, and screw 5 is loosely threaded into bore 38. Stop member 3 is shifted in guide slot 12 while claw 34 moves over the top face of anchoring portion 21 until abutment face 35 is in a desired adjusted position in which pawl 42 is held exactly positioned with respect to ratchet wheel 41. In the desired adjusted position of stop member 3, screw 5 is tightened so that the hard claw 34 is forced into the softer metal of the anchoring portion 21 of cover wall 2 so that the material of the same is deformed whereby a notch is formed. When claw 34 is partly embedded in the deformed material, mounting face 33 abuts against anchoring portion 21. In this permanently fixed position of stop member, stop member 3 cannot turn about screw 5 or be displaced in guide slot 12 by the repeated blows exerted on abutment face 35 by pawl 42 when the line spacing device 4 is operated.

It will be understood that each of the elements described above, or two or more together, may also find a useful application in other types of mounting arrangements differing from the types described above.

While the invention has been illustrated and described as embodied in a mounting arrangement for a stop cooperating with the pawl of a line spacing device of a typewriter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Mounting arrangement comprising, in combination, supporting means having a substantially smooth anchoring face; a member mounted on said supporting means and having a projecting hard claw harder than the material of said supporting means and located in the region of said anchoring face; and means connecting said supporting means and said member and being operable between an adjusting position in which said claw is movable over said anchoring face and in which said member is movable on said supporting means to a desired adjusted position, and a holding position in which said claw is forced into said anchoring face to permanently deform the material of said supporting means to form a notch whereby at least a part of said claw is permanently embedded in the deformed material of said supporting means so that said member is permanently and rigidly fixed on said supporting means in the desired adjusted position.

2. Stop mounting arrangement comprising, in combination, supporting means having a substantially smooth anchoring face; a stop member mounted on said supporting means and having a projecting hard claw harder than the material of said supporting means and located in the region of said anchoring face and an abutment face spaced from said claw; a pawl movably mounted on said supporting means for sliding movement along said abutment face; and means connecting said supporting means and said stop member and being operable between an adjusting position in which said claw is movable over said anchoring face and in which said stop member is movable on said supporting means to a desired adjusted position in which said abutment face is adapted to hold said pawl in a terminal position, and a holding position in which said claw is forced into said anchoring face to permanently deform the material if said supporting means to form a notch whereby at least a part of said claw is permanently embedded in the deformed material of said supporting means so that said stop member is permanently and rigidly fixed on said supporting means in the desired adjusted position and permanently determines the terminal position of said pawl.

3. Mounting arrangement comprising, in combination, supporting means; a member mounted on said supporting means and having a projecting hard claw, said member having a mounting face spaced from said claw; and means for connecting said supporting means and said member and engaging said member intermediate said mounting face and said claw, said means being operable between an adjusting position in which said member is movable on said supporting means to a desired adjusted position, and a holding position in which said claw is forced into and at least partly embedded in said supporting means and in which said mounting face is pressed against said supporting means so that said member is permanently and rigidly fixed on said supporting means in the desired adjusted position.

4. Stop mounting arrangement comprising, in combination, supporting means; a stop member mounted on said supporting means and having a projecting hard claw, said stop member having a mounting face spaced from said claw and an abutment face spaced from said claw; and threaded means connecting said supporting means and said stop member and engaging said stop member intermediate said mounting face and said claw, said threaded means being operable between an adjusting position in which said stop member is movable on said supporting means to a desired adjusted position in which said abutment face is adapted to hold a movable element in a terminal position, and a holding position in which said claw is forced into and at least partly embedded in said supporting means and in which said mounting face is pressed against said supporting means so that said stop member is permanently and rigidly fixed on said supporting means in the desired adjusted position and permanently determines the terminal position of the movable element.

5. Stop mounting arrangement for the line spacing device of a typewriter and comprising, in combination, a metallic supporting means forming part of a typewriter carriage; a stop member mounted on said supporting means and having a projecting claw harder than the metal of said supporting means, said stop member having an abutment face; a line shifting pawl mounted on said supporting means for movement between advanced and retracted positions and cooperating with said abutment face in said advanced position; and threaded means connecting said stop member and said supporting means and being operable between an adjusting position in which said stop member is movable to a desired adjusted position relative to said supporting means and said pawl, and a holding position in which said claw is forced into and at least partly embedded in said metallic supporting means so that said stop member is permanently and rigidly fixed on said supporting means in a desired adjusted position in which said pawl is held by said abutment face in a desired terminal position thereof.

6. Stop mounting arrangement for the line spacing device of a typewriter and comprising, in combination, a metallic supporting means forming part of a typewriter carriage and having a guide slot; a stop member mounted on said supporting means and having a projecting claw harder than the metal of said supporting means, said stop member having an abutment face, said stop member having a portion slidably guided in said guide slot and formed with a threaded bore; a line shifting pawl mounted on said supporting means for movement between advanced and retracted positions and cooperating with said abutment face in said advanced position; and a screw threaded into said bore and connecting said stop member and said supporting means and being operable between an adjusting position in which said stop member is movable in said guide slot to a desired adjusted position relative to said supporting means and said pawl, and a holding position in which said claw is forced into and at least partly embedded in said metallic supporting means so that said stop member is permanently and rigidly fixed on said supporting means in a desired adjusted position in which said pawl is held by said abutment face in a desired terminal position thereof.

7. Stop mounting arrangement for the line spacing device of a typewriter and comprising, in combination, a metallic supporting means forming part of a typewriter carriage and having a guide slot; a T-shaped stop member mounted on said supporting means including a bar portion having on one side thereof and at opposite ends, respectively, a mounting face and a claw projecting beyond said mounting face and being harder than the metal of said supporting means, said stop member having an abutment face, said stop member having on said one side intermediate said mounting face and said claw, a central portion slidably guided in said guide slot and formed with a threaded bore; a line shifting pawl mounted on said supporting means for movement between advanced and retracted positions and cooperating with said abutment face in said advanced position; and a screw threaded into said bore and connecting said stop member and said supporting means and being operable between an adjusting position in which said stop member is movable in said guide slot to a desired adjusted position relative to said supporting means and said pawl, and a holding position in which said claw is forced into and at least partly embedded in said metallic supporting means so that said stop member is permanently and rigidly fixed on said supporting means in a desired adjusted position in which said pawl is held by said abutment face in a desired terminal position thereof.

8. An arrangement as set forth in claim 7, wherein said abutment face is inclined to said mounting face and is located on the other side of said bar portion.

9. An arrangement as set forth in claim 7, wherein said claw has a knife-edge extending across said bar portion.

References Cited in the file of this patent

UNITED STATES PATENTS

| | | |
|---|---|---|
| 439,544 | McCormack | Oct. 28, 1890 |
| 1,908,327 | Dodson | May 9, 1933 |